United States Patent Office 2,965,389
Patented Dec. 20, 1960

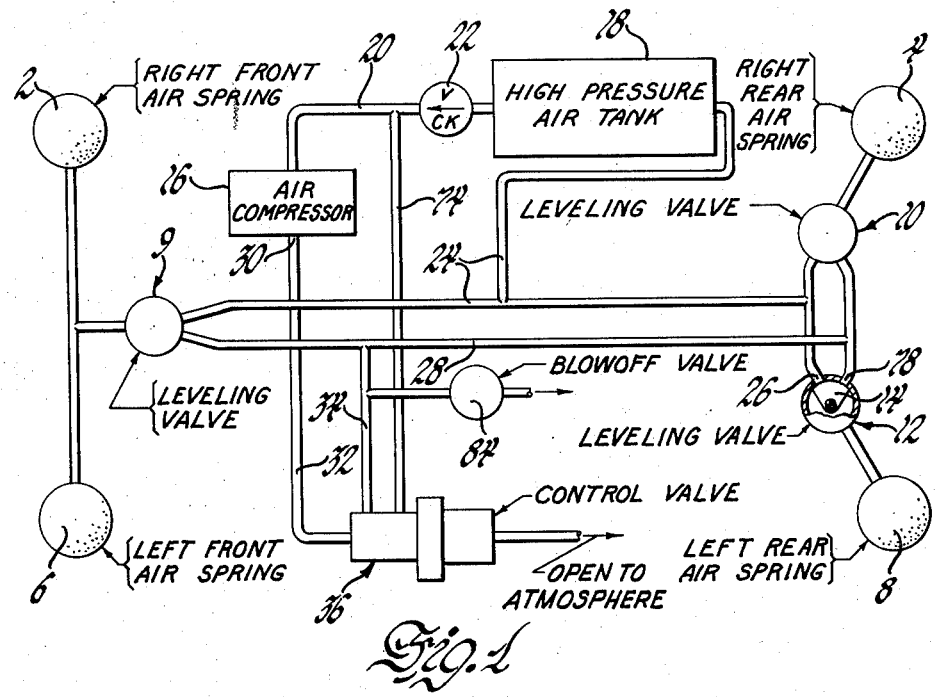
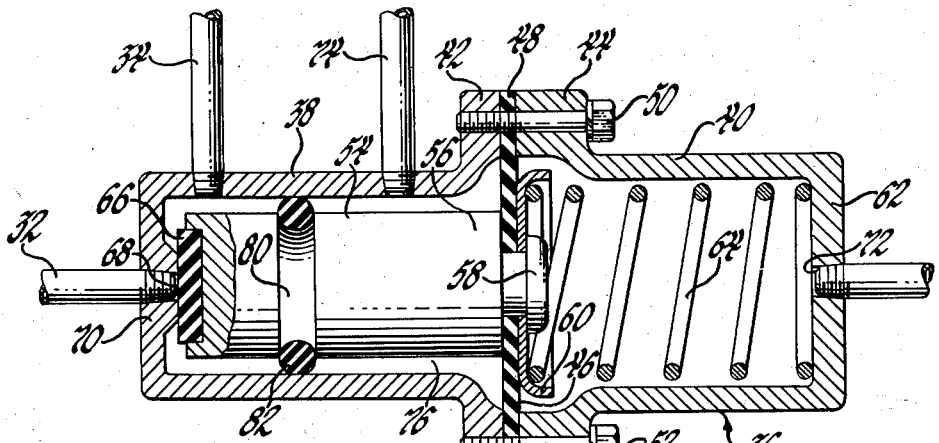

2,965,389

FLUID SUSPENSION CONTROL MECHANISM

Eric R. Dietrich, Lapeer, Mich., assignor to General Motors Corporation, Detroit, Mich., a corporation of Delaware Filed May 9, 1957, Ser. No. 658,198

7 Claims. (Cl. 280—124)

This invention relates to pneumatic vehicle suspension and more particularly to a control mechanism therefor.

Along with the numerous advantages derived from utilization of compressible fluid as the elastic medium in vehicle suspension, certain problems arise, some of which are not readily apparent from superficial consideration. One such problem is presented in jacking one corner of a car equipped with pneumatic suspension. Under such conditions, the leveling valve which controls admission and emission of air for the spring adjacent the vehicle corner in question responds to the enforced displacement between the wheel and the corner of the vehicle by moving to a position permititng air to exhaust from the spring. Since the unnatural displacement between the wheel and corner of the vehicle will be maintained in spite of the effort of the leveling valve to restore the proper trim height by emission of air, the spring will shortly be totally evacuated, resulting in an extremely unstable spring assembly. In some instances, as for example where the spring assembly utilizes a pressure sealed flexible diaphragm, the resulting absence of pressure thereon may allow the diaphragm to be totally separated from its associated parts. The condition described above would necessarily occur as a result of using the so-called bumper jack which is virtually standard equipment for all passenger vehicles.

An object of the present invention is to provide an improved pneumatic suspension system for vehicles.

Another object is to provide a pneumatic suspension system for vehicles which prevents substantial evacuation of air from one of the springs when the adjacent corner of the vehicle is elevated or jacked up for tire replacement or other repairs.

A further object is to provide a fluid suspension system incorporating a device for preventing substantial deflation of any of the individual fluid springs whenever the vehicle engine is not operating.

A still further object is to provide a device of the type described which is automatically rendered operative whenever the vehicle engine is stopped and which is automatically returned to an inoperative condition upon resumption of engine operation.

These and other objects, advantages, and features of the invention will become more fully apparent as reference is had to the accompanying specification and drawings wherein:

Fig. 1 is a schematic view of a typical vehicle air suspension control system incorporating the present invention; and Fig. 2 is an enlarged sectional view showing the operating parts of the invention and the relative relationship thereof when in the operative position.

Referring now to the drawings and particularly Fig. 1, there is illustrated diagrammatically a fluid suspension system which includes individual air springs 2, 4, 6 and 8. Each of the springs is interposed respectively in the conventional manner between one of four vehicle wheels, not shown, and the adjacent corner of the vehicle sprung mass, also not shown. To supply and exhaust air to and from each of the springs, there are provided three leveling valve assemblies 9, 10 and 12, each of which is mounted on the vehicle sprung mass in a known manner. Each valve assembly includes a movable valve closure similar to element 14 of valve assembly 12. It will be understood that each closure 14 is operatively connected in any known manner to the adjacent unsprung portion of the vehicle so that any deviation from desired vertical displacement between the sprung and unsprung mass causes the closure to move to either an exhaust or an intake position which will result in restoration of the desired trim height. In order to assure a source of fluid under pressure for the suspension system, there is provided an engine driven air compressor 16 which supplies a high pressure storage tank 18 via conduit 20. Interposed in conduit 20 between compressor 16 and tank 18 is a check valve 22 which is automatically operative to prevent backflow of pressure in the tank 18 to compressor 16 when the latter is not operating. High pressure air stored in tank 18 is conducted to each leveling valve 9, 10 and 12 via high pressure intake conduit 24. Hence, whenever the leveling valve closure 14 of assembly 12, for example, moves to a position opening leveling valve intake port 26, additional fluid under pressure is supplied to spring 8. Also communicating with valves 9, 10 and 12 is a low pressure return conduit 28 which is connected with the inlet side 30 of compressor 16 via conduit 32. As will be seen in Fig. 1, low pressure conduit 28 is provided with a branch line 34 which effects communication, in a manner shortly to be described, with conduit 32 through control valve 36.

Referring now to Fig. 2, it will be seen that control valve 36 includes a pair of generally cup-shaped members 38 and 40 which are provided with endwise abutting flange portions 42 and 44. Interposed between flange portions 42 and 44 is a flexible diaphragm 46, the peripheral edge 48 of which is clamped between flanges 42 and 44 by bolts 50 and 52. Disposed in generally concentric relation interiorly of member 38 is a piston element 54 which is connected at one end 56 to diaphragm 46 by means of a peened over pilot portion 58 and flanged washer 60. Disposed in compression between washer 60 and the end wall 62 of cup-shaped member 40 is a coil spring element 64 which exerts sufficient pressure on diaphragm 46 to resiliently bias the flexible closure 66 embedded in the end of piston 54 against the orifice 68 in the end wall 70 of member 38. An opening 72 formed in the end wall of member 40 assures constant atmospheric pressure in the cavity defined thereby. It will thus be seen that closure 66 normally prevents communication between exhaust conduit 34 and the conduit 32 leading to the air compressor inlet side. However, in accordance with the present invention, the interior of member 38 is arranged in communicating relation with conduit 20 via a branch conduit 74 which joins the former between check valve 22 and compressor 16. Hence, whenever compressor 16 is operating, high pressure air is delivered therefrom into the cavity 76 in member 38 as well as to high pressure tank 18. As soon as the pressure in cavity 76 reaches a point in excess of the resistance of spring 64, piston 54 is urged axially away from orifice 68 and places exhaust conduit 34 in open communication with the compressor inlet conduit 32. It will now be evident that whenever the compressor is operating, flexible closure 66 will be held away from orifice 68 and hence movement of leveling valve closure 14 to an exhaust position will allow air to exhaust from spring 8 through exhaust port 78 and return to the inlet side of the compressor. In order to prevent high pressure air in cavity 76 from bleeding into conduit 32, piston 54 is provided with a circumferential groove 80 in which is disposed an elastomeric seal or O-ring 82. Seal 82 bears against the inner periphery of casing 38 with sufficient tightness to prevent escape of high pressure air from cavity 72 without inhibiting the linear movement of piston 54. It will be understood that the differential area of O-ring 82 and diaphragm 46 accounts for the linear movement of piston 54 when pressure is introduced into cavity 76.

In order that the invention may be more fully understood, a sequential description of operation of the system follows. Assume that the vehicle is in motion and progressing in a normal manner. Under the stated conditions, the air compressor will be functioning to induce super-atmospheric pressure in conduit 20 to supply air to high pressure tank 18. Similar pressure will be induced in cavity 76 via conduit 74. Closure 66 will therefore be unseated from orifice 68 and allow communication therethrough between spring 8 and the inlet side 30 of the compressor whenever the leveling valve closure is moved to a position opening exhaust port 74. However, when the vehicle is stopped and the engine not operating, check valve 22 will immediately close to prevent back flow from tank 18 to compressor 16. Residual pressure in conduits 20 and 74 will quickly be reduced by leakage past the compressor rings and valves whereupon the pressure of spring 64 will shortly force closure 66 into engagement with orifice 68. Thereafter, movement of valve closure 14 to an exhaust position will be ineffective to permit air to pass from spring 8 beyond member 38. Consequently, if the sprung portion of the vehicle adjacent spring 8 is jacked up for any reason, even though closure 14 is moved to a position opening exhaust port 78 only a limited amount of air will be evacuated from spring 8, thus eliminating the danger of total collapse of the spring assembly. Conversely, when the vehicle is restored to operating condition and the engine is again running, pressure in conduits 20 and 74 will shortly increase sufficiently to overpower spring 64 and reopen the normal exhaust conduit network for functioning in accordance with the position of valve closure 14.

It should be particularly noted that the present invention is entirely automatic in operation and, therefore, eliminates any possibility of human error of forgetfulness. As an additional safety factor, there is provided a blow-off or pressure relief valve 84 which is connected in communicating relation with low pressure conduit 34. Blow-off valve 84 is initially adjusted to relieve excessive pressure built up in low pressure line 28.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In an air suspension system of the type including a plurality of expansible springs, an air compressor for supplying air to said springs, an exhaust network adapted to return air from said springs to said compressor, and means actuated by predetermined pressure drop in said compressor effective to block movement of air from said springs to said compressor.

2. In an air suspension system of the type including a plurality of expansible springs, an air compressor, a high pressure network connecting said compressor with said springs, an exhaust network adapted to return air from said springs to said compressor, and a device for blocking movement of air through said exhaust network to said compressor, said device being actuated to its blocking position automatically responsive to occurrence of a predetermined reduction of internal compressor pressure.

3. In an air suspension system of the type including a plurality of expansible springs, an air compressor, a high pressure network connecting the exhaust side of said compressor with said springs, a check valve in said high pressure network preventing backflow from said high pressure network to said compressor, an exhaust network adapted to return air from said springs to the inlet side of said compressor, and a device interposed in said exhaust network movable to a position blocking movement of air to said compressor, said device being actuated to its blocking position responsive to occurrence of a predetermined reduction of internal compressor pressure.

4. In an air suspension system of the type including a plurality of expansible springs, an air compressor for supplying air to said springs, an exhaust network adapted to return air from said springs to said compressor, a plurality of leveling valves for said springs movable to intake or exhaust positions responsive to changes in expansion of said springs, and means actuated by predetermined pressure drop in said compressor effective to prevent movement of air from said springs to said compressor regardless of the position of said leveling valve.

5. In a vehicle air suspension system of the type including a plurality of expansible springs and a plurality of leveling valves therefor movable to intake or exhaust positions responsive to changes in displacement between the sprung and unsprung mass of the vehicle, an air compressor, a high pressure tank communicating with the exhaust side of said compressor, a check valve for preventing backflow of air from said tank to said compressor, a high pressure conducting network connecting said high pressure tank with said leveling valves, a low pressure return network connecting said leveling valves with the inlet side of said compressor, a valve disposed in said low pressure return network between said leveling valves and said compressor, and means responsive to pressure drop between said check valve and said compressor for actuating said last mentioned valve to a position preventing flow of low pressure air from said leveling valves to said compressor inlet.

6. An air suspension system comprising a plurality of expansible springs, an air compressor, a high pressure tank, a conduit connecting said compressor and high pressure tank, a check valve in said conduit, a high pressure network connecting said high pressure tank with said springs, an exhaust network adapted to return air from said springs to said compressor, and a device for blocking movement of air through said exhaust network to said compressor, said device comprising a casing interposed in said low pressure network, a diaphragm partiton in said casing, a slidable closure connected to said diaphragm, means providing communication between said conduit and the portion of said casing on one side of said diaphragm to urge said closure in one direction, and a spring disposed in said casing at the other side of said diaphragm, said spring being adjusted to urge said closure in the other direction to an exhaust network blocking position when air pressure in said conduit drops below a predetermined level.

7. In an air suspension system of the type including a plurality of expansible springs, an air compressor, a high pressure network connecting said compressor with said springs, an exhaust network connecting said springs with said compressor, a plurality of leveling valves interposed in said networks and movable responsive to variation in expansion of said springs to selectively introduce or exhaust air from said springs, a pressure responsive device for blocking movement of air through said exhaust network to said compressor regardless of the position of said leveling valves, said device comprising a casing interposed in said low pressure network, a slidable closure disposed in said casing, a diaphragm connecting said closure and said casing, yieldable means on one side of said diaphragm urging said closure to an exhaust network blocking position, and means communicating between said high pressure network and the other side of said diaphragm whereby the closure is pressure urged to an exhaust network opening position as long as the pressure in said high pressure network is maintained at a predetermined level.

References Cited in the file of this patent

UNITED STATES PATENTS

| | | |
|---|---|---|
| 1,105,805 | Liebowitz | Aug. 4, 1914 |
| 2,475,701 | Eaton | July 12, 1949 |
| 2,477,669 | Stephens | Aug. 2, 1949 |
| 2,844,385 | Pribonic | July 22, 1958 |
| 2,848,249 | Bertsch | Aug. 19, 1958 |